US008315853B2

(12) United States Patent
Kim et al.

(10) Patent No.: US 8,315,853 B2
(45) Date of Patent: Nov. 20, 2012

(54) MDCT DOMAIN POST-FILTERING APPARATUS AND METHOD FOR QUALITY ENHANCEMENT OF SPEECH

(75) Inventors: Hyun-woo Kim, Daejeon-si (KR); Jong-mo Sung, Daejeon-si (KR); Mi-suk Lee, Daejeon-si (KR); Do-young Kim, Daejeon-si (KR); Byung-sun Lee, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1203 days.

(21) Appl. No.: 12/155,542

(22) Filed: Jun. 5, 2008

(65) Prior Publication Data

US 2009/0150143 A1 Jun. 11, 2009

(30) Foreign Application Priority Data

Dec. 11, 2007 (KR) ........................ 10-2007-0128525

(51) Int. Cl.
*G06F 15/00* (2006.01)
*G10L 11/00* (2006.01)
*G10L 19/00* (2006.01)
*G10L 21/00* (2006.01)
*G10L 19/14* (2006.01)
*G10L 19/12* (2006.01)
*G10L 21/02* (2006.01)

(52) U.S. Cl. ........ 704/200; 704/201; 704/205; 704/219; 704/220; 704/222; 704/224; 704/228

(58) Field of Classification Search .................. 704/200, 704/201, 205, 219, 220, 222, 224, 228
See application file for complete search history.

(56) References Cited

U.S. PATENT DOCUMENTS 5,467,425 A * 11/1995 Lau et al. ...................... 704/243
5,608,840 A * 3/1997 Tsuboka ........................ 704/236
5,953,696 A * 9/1999 Nishiguchi et al. ........... 704/209
6,269,334 B1 * 7/2001 Basu et al. ................. 704/256.3
(Continued)

FOREIGN PATENT DOCUMENTS

WO 99/62057 12/1999
(Continued)

OTHER PUBLICATIONS

Volodya Grancharov et al., "Noise-Dependent Postfiltering", ICASSP 2004, pp. 457-460.

*Primary Examiner* — Eric Yen
(74) *Attorney, Agent, or Firm* — Staas & Halsey LLP

(57) ABSTRACT

A post-filtering apparatus and method for speech enhancement in a modified discrete cosine transform (MDCT) domain are disclosed. In the apparatus and method, previous and current MDCT coefficients are used for obtaining a speech spectrum coefficient similar to a real speech spectrum, and a convex function is used for transforming the speech spectrum coefficient and obtaining a post-filter coefficient so that difference can increase in the case where the speech spectrum coefficient is small but decrease in the case where the coefficient is large. Then, the post-filter coefficient is applied to the MDCT coefficient. With this configuration, both the current and previous MDCT values are used, so that it is possible to obtain a spectrum coefficient similar to the real speech spectrum and to obtain a more accurate filter coefficient. Further, the coefficient is adaptively transformed through the convex function, thereby enhancing speech quality.

13 Claims, 3 Drawing Sheets

U.S. PATENT DOCUMENTS

| | | | | |
|---|---|---|---|---|
| 6,539,357 | B1 * | 3/2003 | Sinha | 704/270.1 |
| 6,937,979 | B2 | 8/2005 | Gao et al. | |
| 7,124,077 | B2 | 10/2006 | Wang et al. | |
| 7,233,898 | B2 * | 6/2007 | Byrnes et al. | 704/246 |
| 7,308,400 | B2 * | 12/2007 | Luo et al. | 704/9 |
| 7,379,873 | B2 * | 5/2008 | Kemmochi | 704/269 |
| 7,552,048 | B2 * | 6/2009 | Xu et al. | 704/206 |
| 7,606,711 | B2 * | 10/2009 | Sato | 704/265 |
| 7,647,226 | B2 * | 1/2010 | Sato | 704/260 |
| 7,668,699 | B2 * | 2/2010 | Chen et al. | 702/191 |
| 7,788,105 | B2 * | 8/2010 | Miseki | 704/500 |
| 7,809,146 | B2 * | 10/2010 | Hiroe et al. | 381/94.3 |
| 7,933,847 | B2 * | 4/2011 | Andrew et al. | 706/12 |
| 7,987,089 | B2 * | 7/2011 | Krishnan et al. | 704/214 |
| 2001/0008995 | A1 | 7/2001 | Kim et al. | |
| 2002/0128830 | A1 * | 9/2002 | Kanazawa et al. | 704/226 |
| 2004/0006472 | A1 * | 1/2004 | Kemmochi | 704/269 |
| 2006/0020450 | A1 * | 1/2006 | Miseki | 704/219 |

FOREIGN PATENT DOCUMENTS

WO 03/003348 A1 1/2003

* cited by examiner

MDCT DOMAIN POST-FILTERING APPARATUS AND METHOD FOR QUALITY ENHANCEMENT OF SPEECH

CROSS REFERENCE TO RELATED APPLICATIONS

This application claims priority from Korean Patent Application No. 10-2007-0128525, filed on Dec. 11, 2007, the disclosure of which is incorporated herein in its entirety by reference.

BACKGROUND OF THE INVENTION

1. Field of the Invention

The present invention relates to a filtering apparatus and method thereof, and more particularly to a post-filtering apparatus and method thereof for reducing coding noise without distorting a speech signal in a Modified Discrete Cosine Transform (MDCT) domain.

2. Description of the Related Art

To transmit and process a speech signal, an analog speech signal is generally subjected to a series of modulation processes, such as sampling, quantization, etc. However, since such a modulated signal is too large, there is a limit in directly processing the modulated signal. Accordingly, various codecs have been proposed for compressing and decompressing the signal.

A narrowband codec capable of encoding and decoding speech having a bandwidth of 300 Hz~3,400 Hz exhibits a high compression ratio based on Code Excited Linear Prediction (CELP) which models a speech production process. Meanwhile, a wideband codec capable of encoding and decoding speech having a bandwidth of 50 Hz~7,000 Hz has recently been developed to improve naturalness and articulation which are pointed out as drawbacks of the narrowband codec. As an example of the wideband codec, there are G.729.1, Adaptive Multi-Rate Wideband (AMR-WB), etc. Generally, the wideband codec transforms the signal of a time domain to that of a Modified Discrete Cosine Transform (MDCT) domain and quantizes it.

When a codec of a low bit rate is used in encoding and decoding speech, the quality of speech is degraded due to coding noise. To solve this problem, the following two methods have been proposed.

One is a method of shaping a coding noise spectrum in an encoder. In this method, the coding noise spectrum is shaped depending on a speech spectrum so that a ratio of speech signal to coding noise power in each frequency is higher than a minimum value. This method is used in CELP, Adaptive Predictive Coding (APC), Multi-Pulse Linear Predictive Coding (MPLPC), etc. Further, this method is based on a principle that a masking effect prevents humans from hearing the coding noise.

The other is a method of using an adaptive post-filter in a decoder. In this method, a filter having a frequency response similar to speech is used to reduce coding noise. Further, this method is used in 8 kb/s Vector Sum Excited Linear Prediction (VSELP), 6.7 kb/s VSELP (Japanese digital cellular, JDC), G.729B, etc.

In particular, a wideband processing post-filter has been introduced to cope with a recently increasing trend of using the wideband codec to provide higher quality of speech. As a representative example, there is an MDCT based post-filter as employed in G.729.1. This technique is based on applying the post-filter to an MDCT coefficient obtained by dequantization in the decoder, in which 160 MDCT coefficients are allocated to 10 subbands and envelopes are summed for each of the subbands. At this time, a new MDCT coefficient can be obtained by multiplying a filter coefficient based on an envelope by a filter coefficient based on the sum of the envelopes.

However, such a conventional method has a problem of distorting the speech spectrum since only the current MDCT coefficient is used. For example, if the current MDCT coefficient is small, even though a previous MDCT coefficient is large, it is necessary to allocate a small value to the current MDCT coefficient. However, the conventional method is not performed in this manner. Further, since a speech signal is linearly emphasized according to the magnitude of the speech spectrum in a section where the speech spectrum is high, the conventional problem causes sever distortion of the speech signal.

SUMMARY OF THE INVENTION

The present invention provides a post-filtering apparatus and method thereof for more effectively reducing coding noise without distorting a speech signal in an MDCT domain.

Additional aspects of the invention will be set forth in the description which follows, and in part will be apparent from the description, or may be learned by practice of the invention.

The present invention discloses a post-filtering apparatus for speech enhancement in an MDCT domain. The apparatus includes a spectrum coefficient producer which produces a spectrum coefficient based on an MDCT coefficient of a current speech frame and an MDCT coefficient of a previous speech frame; a normalizer which normalizes the produced spectrum coefficient; a transformer which transforms the spectrum coefficient by mapping the normalized spectrum coefficient to a convex function; a filter coefficient producer which produces a filter coefficient while adjusting a reflection degree of the transformed spectrum coefficient; and an MDCT coefficient producer which produces a new MDCT coefficient by multiplying the produced filter coefficient by the MDCT coefficient of the current speech frame.

The apparatus may further include an energy calculator which calculates energy of the MDCT coefficient of the current speech frame; and a gain controller which controls a gain of the new MDCT coefficient so that the new MDCT coefficient produced by the MDCT coefficient producer has the same energy as the MDCT coefficient of the current speech frame.

The spectrum coefficient producer may produce the spectrum coefficient by a square root of sum of squared MDCT coefficients of the current and previous speech frames.

The normalizer may divide each spectrum coefficient by a maximum spectrum coefficient or by a square root of energy of the spectrum coefficient to perform normalization.

The transformer may use a log-scale convex function to transform the normalized spectrum coefficient so that a difference can increase in the case where the speech spectrum coefficient is small but decrease in the case where the speech spectrum coefficient is large.

The present invention also discloses a post-filtering method for speech enhancement in an MDCT domain. The method includes: producing a spectrum coefficient based on an MDCT coefficient of a current speech frame and an MDCT coefficient of a previous speech frame; normalizing the produced spectrum coefficient; transforming the spectrum coefficient by mapping the normalized spectrum coefficient to a convex function; producing a filter coefficient while adjusting a reflection degree of the transformed spectrum coefficient;

and producing a new MDCT coefficient by multiplying the produced filter coefficient by the MDCT coefficient of the current speech frame.

The method may further include calculating energy of the MDCT coefficient of the current speech frame; and controlling a gain of the new MDCT coefficient so that the new MDCT coefficient has the same energy as the MDCT coefficient of the current speech frame.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the aspects of the invention.

DETAILED DESCRIPTION OF EXEMPLARY EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art.

Figure 1:
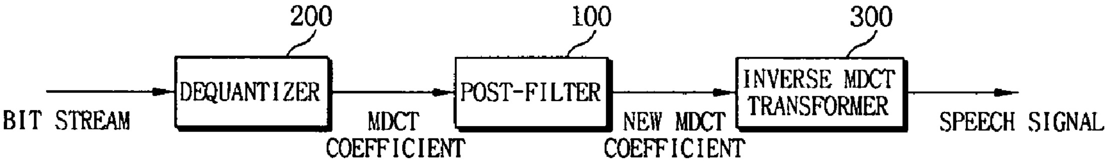
FIG. 1 is a schematic view of a post-filtering apparatus according to an exemplary embodiment of the present invention.

FIG. 1 is a schematic view of a post-filtering apparatus according to an exemplary embodiment of the present invention.

A post-filter 100 is interposed between a dequantizer 200 and an inverse modified discrete cosine transform (MDCT) transformer 300.

The dequantizer 200 receives and then dequantizes a speech bit stream, thereby applying an MDCT coefficient of each speech frame to the post-filter 100. The post-filter 100 sums previous and current MDCT coefficients and obtains a coefficient corresponding to a real speech spectrum. Further, the post-filter 100 uses a predetermined convex function for transforming the coefficient so that a differential value increases in the case where the coefficient is small but decreases the differential value in the case where the coefficient is large, thereby obtaining a filter coefficient and producing a new MDCT coefficient based on the filter coefficient. The produced MDCT coefficient is transformed into a speech signal via the MDCT transformer 300, and is then applied to a loudspeaker or similar speech-reproducing device.

Figure 2:
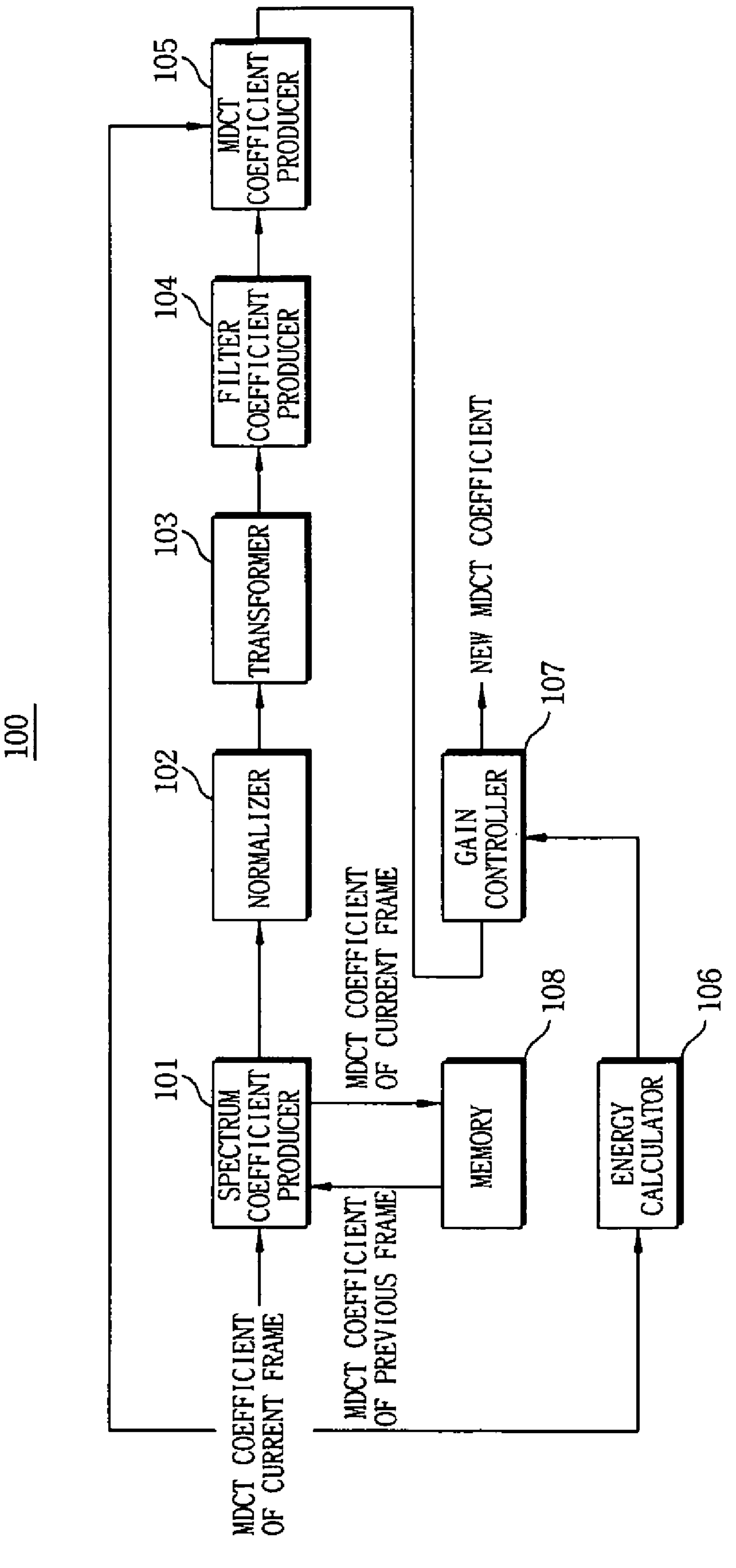
FIG. 2 is a block diagram of the post-filtering apparatus according to the embodiment of the present invention.

FIG. 2 is a block diagram of the post-filter apparatus according to the embodiment of the present invention.

The post-filter 100 according to the embodiment of the present invention includes a spectrum coefficient producer 101, a normalizer 102, a transformer 103, a filter coefficient producer 104, and an MDCT coefficient producer 105 and further includes an energy calculator 106, a gain controller 107, and a memory 108.

The spectrum coefficient producer 101 produces a spectrum coefficient that is substantially equal to the speech spectrum of a current frame on the basis of the MDCT coefficients of the current speech frame and a previous speech frame.

The MDCT coefficient of each speech frame may be received from the dequantizer 200 connected to a previous terminal, and the dequantizer 200 dequantizes the received bit stream and produces the MDCT coefficient. At this time, the MDCT coefficient of each speech frame is stored in the memory 108 and is loaded into the spectrum coefficient producer 101 as necessary. For example, when the MDCT coefficient of the current speech frame is input to the spectrum coefficient producer 101, the spectrum coefficient producer 101 can load the MCD coefficient of the previous speech frame from the memory 108. Further, the spectrum coefficient producer 101 stores the MDCT coefficient of the current speech frame in the memory 108.

The spectrum coefficient produced in the spectrum coefficient producer 101 is obtained on the basis of the MDCT coefficients of the current speech frame and the previous speech frame received from the external dequantizer 200 or the memory 108. At this time, the spectrum coefficient may be obtained by taking the square root of the sum of squared MDCT coefficients of the current and previous speech frames, which is as follows.

$$SPEC(i)=(MDCT_{curr}(i)^2+MDCT_{prev}(i)^2)^{1/2}\quad i=0, 1, \ldots, N-1 \qquad \text{[Equation 1]}$$

where SPEC(i) is the spectrum coefficient, $MDCT_{curr}(i)$ is the MDCT coefficient of the current speech frame, and $MDCT_{prev}(i)$ is the MDCT coefficient of the previous speech frame.

The produced spectrum coefficient is input to the normalizer 102, and the normalizer 102 normalizes the input spectrum coefficient. At this time, the normalization may be achieved by dividing each spectrum coefficient by the maximum spectrum coefficient, which is as follows.

$$\begin{aligned} NORM &= \mathrm{MAX}(SPEC(i)) \\ SPEC(i) &= \frac{SPEC(i)}{NORM} \\ i &= 0.1, \ \ldots \ , N-1 \end{aligned} \qquad \text{[Equation 2]}$$

where SPEC(i) is the spectrum coefficient produced in the spectrum coefficient producer 101, and NORM is the maximum value among the spectrum coefficients.

Alternatively, the normalizer 102 may perform the normalization by dividing each spectrum coefficient by a square root of the energy of the spectrum coefficient, which is as follows.

$$\begin{aligned} NORM &= \sqrt{\sum_{i=0}^{N-1} SPEC(i)^2 / N} \\ SPEC(i) &= \frac{SPEC(i)}{NORM} \\ i &= 0.1, \ \ldots \ , N-1 \end{aligned} \qquad \text{[Equation 3]}$$

where SPEC(i) is the spectrum coefficient produced in the spectrum coefficient producer 101.

The normalized spectrum coefficient is input to the transformer 103, and the transformer 103 maps the normalized spectrum coefficients to the convex function, thereby producing the transformed spectrum coefficients.

According to an exemplary embodiment, the convex function may include a log-scale function so that the differential value can increase in the case where the speech spectrum coefficient is small but decrease in the case where the speech spectrum coefficient is large. For example, the transformer 103 may use a logarithmic function as follows.

$$f(SPEC(i))=a\times\log_{10}(m\times SPEC(i)+n)\quad i=0, 1, \ldots, N-1 \qquad \text{[Equation 4]}$$

where f(SPEC(i)) is the transformed spectrum coefficient, SPEC(i) is the spectrum coefficient normalized by the normalizer 102, and a, m and n are preset constants.

The transformed spectrum coefficient is input to the filter coefficient producer 104, and the filter coefficient producer 104 produces a filter coefficient while adjusting a reflection degree of the transformed spectrum coefficient. Here, the reflection degree is a ratio of a demanding degree of using the dequantized MDCT coefficient to a demanding degree of improving the MDCT coefficient through the post-filter.

For example, if the reflection degree of the coefficient is 'factor,' the filter coefficient produced in the filter coefficient producer 104 can be represented as follows.

$$\text{coeff}(i)=\text{factor}\times f(SPEC(j))+(1-\text{factor})\quad i=0, 1, \ldots, N-1 \qquad \text{[Equation 5]}$$

where coeff(i) is the filter coefficient, factor is the reflection degree of the coefficient, and f(SPEC(i)) is the spectrum coefficient transformed by the transformer 103.

At this time, the reflection degree or the reflection ratio of the coefficient may be properly set according to the quantization method and the bit rate.

The filter coefficient is input to the MDCT coefficient producer 105, and the MDCT coefficient producer 105 produces a new MDCT coefficient by multiplying the MDCT coefficient of the current speech frame by the filter coefficient. For example, the MDCT coefficient producer 105 may be achieved by a multiplier that multiplies the MDCT coefficient of the current speech frame by the output of the filter coefficient producer 104.

The MDCT coefficient produced by the MDCT coefficient producer 105 is applied to the gain controller 107 so that the energy of the produced MDCT coefficients can be adjusted to be equal to the energy of the MDCT coefficients of the current speech frame.

To this end, the energy calculator 106 calculates the energy of the MDCT coefficient of the current speech frame. For example, the energy calculator 106 may calculate the energy as follows.

$$\text{Energy}=\sum_{i=0}^{N-1} MDCT(i)^2 \qquad \text{[Equation 6]}$$

where MDCT(i) is the MDCT coefficient of the current speech frame.

Further, the gain controller 107 receives calculation results from the MDCT coefficient producer 105 and the energy calculator 106, and controls a gain of the MDCT coefficient. For example, the gain controller 107 receives the energy of the MDCT coefficient produced by the MDCT coefficient producer 105 and the energy of the current frame calculated by the energy calculator 106, and obtains a normalization value, thereby multiplying each coefficient by the inverse normalization value. This process can be represented as follows.

$$\text{Energy}'=\sum_{i=0}^{N-1} MDCT'(i)^2 \qquad \text{[Equation 7]}$$

$$Norm'=\sqrt{\text{Energy}/\text{Energy}'}$$

$$MDCT_{new}(i)=\frac{MDCT'(i)}{Norm'}$$

$$i=0.1, \ldots, N-1$$

where MDCT'(i) is the MDCT coefficient produced by the MDCT coefficient producer 105, Energy is the energy of the current MDCT coefficient calculated by the energy calculator 106, and $\text{MDCT}_{new}$(i) is the new MDCT coefficient, the gain of which is controlled.

With this configuration, the spectrum coefficient producer 101 uses the MDCT coefficients of both the current frame and the previous frame, so that it is possible to obtain a coefficient similar to the real speech spectrum. Thus, the filter coefficient producer 105 can obtain a more accurate filter coefficient, and speech spectrum distortion and coding noise are reduced. Also, the transformer 103 transforms the coefficients through the convex function, so that the difference can increase in the case where the speech spectrum coefficient is small but decrease in the case where the speech spectrum coefficient is large, thereby causing noticeable speech enhancement.

Next, a post-filtering method according to an exemplary embodiment of the present invention will be described with reference to FIG. 3.

Figure 3:
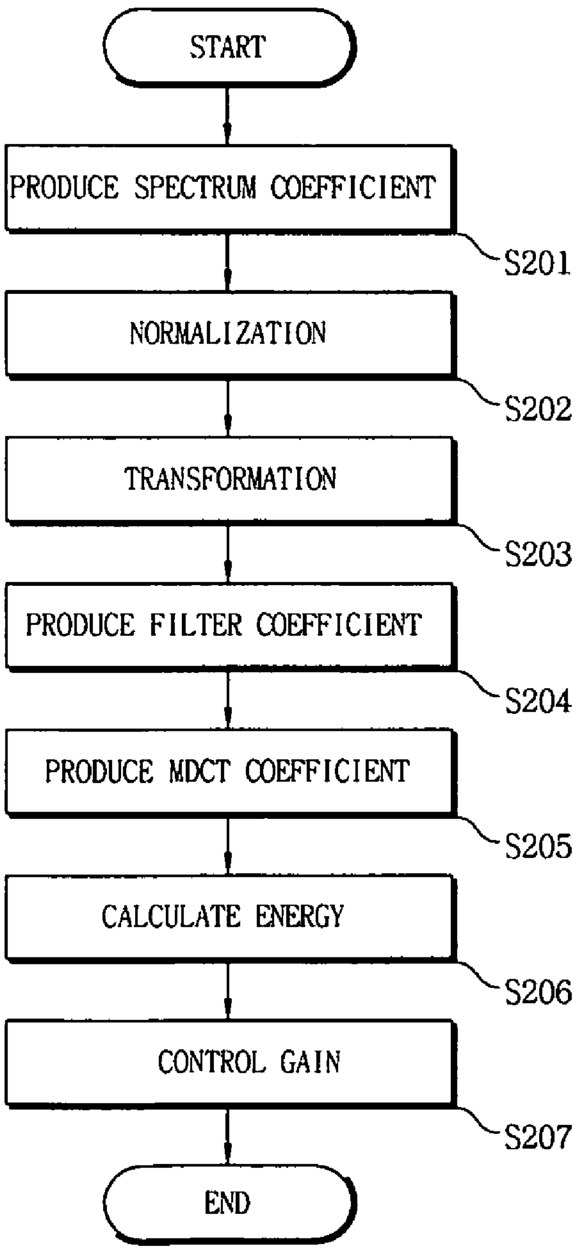
FIG. 3 is a flowchart of a post-filtering method according to an exemplary embodiment of the present invention.

Referring to FIG. 3, when the MDCT coefficient of the frame, which is obtained by dequantizing the bit stream, is input, the spectrum coefficient is produced on the basis of the MDCT coefficients of the current speech frame and the previous speech frame (S101). Since the MDCT coefficients of the respective frames are separately stored, they may be loaded when producing the spectrum coefficient. The spectrum coefficient may be obtained by taking the square root of the sum of squared MDCT coefficients of the current and previous speech frames (refer to Equation 1).

Then, the spectrum coefficient is normalized (S102). At this time, the normalization may be achieved by dividing each spectrum coefficient by the maximum spectrum coefficient or by the square root of the energy of the spectrum coefficient (refer to Equations 2 and 3).

The normalized spectrum coefficients are mapped to the convex function and then transformed (S103). Here, the log-scale convex function is used so that the difference can increase in the case where the speech spectrum coefficient is small but decrease in the case where the coefficient is large (refer to the convex function of Equation 4).

Then, the filter coefficient is produced while adjusting the reflection degree of the transformed spectrum coefficient (S104). For example, if the reflection degree of the coefficient is 'factor,' the filter coefficient is produced as shown in Equation 5. Here, the reflection degree of the coefficient may be appropriately set according to the quantization method and the bit rate.

Then, a new MDCT coefficient is produced by multiplying the produced filter coefficient by the MDCT coefficient of the current frame (S105). For example, if the MDCT coefficient produced at the operation S105 is 'MDCT' (i),' it can be represented as follows.

$$MDCT'(i)=\text{coeff}(i)\times MDCT_{curr}(i)\quad i=0, 1, \ldots, N-1 \qquad \text{[Equation 8]}$$

where coeff(i) is the filter coefficient produced at the operation S104, and $\text{MDCT}_{curr}$(i) is the MDCT coefficient of the current speech frame.

Then, the energy of the MDCT coefficient of the current speech frame is calculated (S106). The energy calculation method refers to Equation 6. When the energy of the MDCT coefficient of the current speech frame is obtained, the gain of the MDCT coefficient produced at the operation S105 is adjusted on the basis of the obtained energy (S107). The gain control method refers to Equation 7.

Through the foregoing operations, both the MDCT coefficients of the current speech frame and the previous speech frame are used in obtaining the spectrum coefficient, so that the filter coefficient can be more accurately obtained. Further, the coefficient is transformed through the convex function, so that the speech spectrum distortion and the coding noise can be reduced.

As described above, the present invention provides a post-filter apparatus and method for reducing coding noise without distorting a speech signal in a modified discrete cosine transform (MDCT) domain, which have effects as follows.

First, the conventional post-filtering manner in an MDCT domain employs an MDCT coefficient of a current frame, but the present invention uses MDCT coefficients of both a previous frame and a current frame to obtain a coefficient more similar to a real speech spectrum. The prevent invention can not only obtain a more accurate post-filtering coefficient, but also suppress distortion of the speech spectrum while reducing coding noise.

Second, in order to reduce coding noise while decreasing distortion, a convex function is used to increase a difference in the case where a speech spectrum coefficient is small and to decrease the difference in the case where the speech spectrum coefficient is large, so that the same coding noise is caused in a frequency domain of a weak signal and speech distortion is suppressed in the frequency domain of a strong signal, thereby enhancing speech quality.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A post-filter apparatus for speech enhancement in a Modified Discrete Cosine Transform (MDCT) domain, comprising:

a spectrum coefficient producer configured to produce a spectrum coefficient based on an MDCT coefficient of a current speech frame and an MDCT coefficient of a previous speech frame;

a normalizer configured to normalize the produced spectrum coefficient;

a transformer configured to transform the spectrum coefficient by mapping the normalized spectrum coefficient to a convex function;

a filter coefficient producer configured to produce a filter coefficient while adjusting a reflection degree of the transformed spectrum coefficient;

an MDCT coefficient producer configured to produce a new MDCT coefficient by multiplying the produced filter coefficient by the MDCT coefficient of the current speech frame; and an inverse transformer transforming the new MDCT coefficient into a speech signal.

2. The apparatus according to claim 1, further comprising:

an energy calculator which calculates energy of the MDCT coefficient of the current speech frame; and a gain controller which controls a gain of the new MDCT coefficient so that the new MDCT coefficient produced by the MDCT coefficient producer has the same energy as the MDCT coefficient of the current speech frame.

3. The apparatus according to claim 1, further comprising:

a memory which stores the MDCT coefficient of each speech frame.

4. The apparatus according to claim 1, wherein the spectrum coefficient producer produces the spectrum coefficient by a square root of sum of squared MDCT coefficients of the current and previous speech frames.

5. The apparatus according to claim 1, wherein the normalizer divides each spectrum coefficient by a maximum spectrum coefficient or by a square root of energy of the spectrum coefficient to perform normalization.

6. The apparatus according to claim 1, wherein the transformer uses a log-scale convex function to transform the normalized spectrum coefficient.

7. The apparatus according to claim 6, wherein the convex function is as follows:

where SPEC(i) is the normalized spectrum coefficient, and a, m and n are preset constants.

8. A post-filtering method for speech enhancement in a Modified Discrete Cosine Transform (MDCT) domain, comprising: performing, by a processor, operations of:

producing a spectrum coefficient based on an MDCT coefficient of a current speech frame, which MDCT coefficient of the current speech frame is loaded from a memory, and an MDCT coefficient of a previous speech frame;

normalizing the produced spectrum coefficient;

transforming the spectrum coefficient by mapping the normalized spectrum coefficient to a convex function;

producing a filter coefficient while adjusting a reflection degree of the transformed spectrum coefficient;

producing a new MDCT coefficient by multiplying the produced filter coefficient by the MDCT coefficient of the current speech frame; and transforming the new MDCT coefficient into a speech signal.

9. The method according to claim 8, further comprising:

calculating energy of the MDCT coefficient of the current speech frame; and controlling a gain of the new MDCT coefficient so that the new MDCT coefficient has the same energy as the MDCT coefficient of the current speech frame.

10. The method according to claim 8, wherein the producing of the spectrum coefficient produces the spectrum coefficient as follows:

where SPEC(i) is the spectrum coefficient, MDCTcurr(i) is the MDCT coefficient of the current speech frame, and MDCTprev(i) is the MDCT coefficient of the previous speech frame.

11. The method according to claim 8, wherein the normalizing of the produced spectrum coefficient divides each spectrum coefficient by a maximum spectrum coefficient or by a square root of energy of the spectrum coefficient for normalizing.

12. The method according to claim 8, wherein the transforming of the spectrum coefficient uses a log-scale convex function to transform the normalized spectrum coefficient.

13. The method according to claim 12, wherein the convex function is as follows:

where SPEC(i) is the normalized spectrum coefficient, and a, m and n are preset constants.

* * * * *